United States Patent [19]
Ray et al.

[11] Patent Number: 5,189,911
[45] Date of Patent: Mar. 2, 1993

[54] LIQUID LEVEL AND TEMPERATURE SENSING DEVICE

[75] Inventors: John T. Ray, Brandon; Roland P. Piccone, Sarasota; Peter W. Mansfield, Holmes Beach, all of Fla.

[73] Assignee: Sarasota Measurements & Controls, Inc., Sarasota, Fla.

[21] Appl. No.: 819,058

[22] Filed: Jan. 10, 1992

[51] Int. Cl.$^5$ .................. G01F 23/00; G01R 33/18
[52] U.S. Cl. ........................ 73/292; 73/290 V; 73/308; 324/207.21; 367/908
[58] Field of Search ............. 73/313, 290 V, 308, 73/304 R, 292; 324/207.13, 207.21; 374/142

[56] References Cited

U.S. PATENT DOCUMENTS

| | | | |
|---|---|---|---|
| 3,372,592 | 3/1968 | Gravert | 73/290 V |
| 4,305,283 | 12/1981 | Redding | 73/290 V |
| 4,361,835 | 11/1982 | Nagy | 73/313 X |
| 4,726,226 | 2/1988 | Tellerman | 73/313 X |
| 4,815,323 | 3/1989 | Ellinger et al. | 73/292 X |
| 4,839,590 | 6/1989 | Koski et al. | 324/207.13 X |
| 5,076,100 | 12/1991 | Hunter | 324/207.21 X |

Primary Examiner—Daniel M. Yasich
Attorney, Agent, or Firm—A. W. Fisher, III; A. W. Fisher, III

[57] ABSTRACT

A liquid level and temperature sensing device for monitoring and measuring the level of liquid stored within a tank or reservoir comprising control circuitry to generate and transmit digital level interrogation pulses and a transducer to receive sonic level return signals corresponding to the digital level interrogation pulses and generate corresponding digital level signals and logic circuitry to measure the time lapse between corresponding digital level interrogation pulses and the corresponding digital level signals and a lower sensing probe including an inner conductor coupled to the control circuity to receive the digital level interrogation pulses and a float to float on the liquid within the tank or reservoir including a magnet movable tube to interact with the electromagnetic field generated in the inner conductor by the digital level interrogation pulses to generate the corresponding sonic level return pulses transmitted to the transducer to generate the corresponding digital level signal whereby the time lapse between the digital level interrogation pulse and corresponding digital level signal indicates the level of liquid within the tank or reservoir.

25 Claims, 5 Drawing Sheets

LIQUID LEVEL AND TEMPERATURE SENSING DEVICE

BACKGROUND OF THE INVENTION

1. Field of the Invention

A liquid level and temperature sensing device for monitoring and measuring the level of liquid and temperature stored within a tank or reservoir.

2. Description of the Prior Art

U.S. Pat. No. 4,726,226 shows a device to measure the volume of the contents of a tank and the temperature or other parameter to be reported to a central data collection area for recording and control.

U.S. Pat. No. 4,305,283 describes an apparatus for indicating the level of liquid in a tank including a float resting on the surface of the liquid connected by a wire or chain to a level sensing mechanism so that movements of the float due to changes in the liquid level, are communicated to the mechanism. The mechanism may register and/or indicate the height of the level and produce electrical signals corresponding to the height of the level.

The use of electrical sensing devices such as floating controlled variable resistors can reduce the friction problems associated with such devices. In addition, if the liquid is flammable precautions should be taken to prevent ignition of the liquid by electrical sparks. A common method to overcome these problems is to extend a mechanical linkage through the wall of the tank and connect the linkage to electrical sensing and indicating equipment outside the tank. However, such linkages are also prone to friction problems.

U.S. Pat. No. 3,898,555 relates to a sensing device employing a Wiedemann Effect.

U.S. Pat. No. 4,726,226 describes sensing the temperature of liquid in a tank accomplished by the use of either temperature sensitive resistors or of temperature sensitive semiconductor devices. Such sensors typically provide a voltage indicative of the temperature of the region in which such devices are located. For most tank situations, for example, there will be a desire to know the temperature at several locations in the tank and therefore, several sensors are located about the tank at those locations.

The results measured concerning the liquid contents of a tank in this example must then be conveyed to the user.

U.S. 4,305,283 shows a position determining apparatus comprising a taut electrically-conductive member; a pulse generator to feed a pulse of electric current along the member; a magnet located at a variable first point along the member, for example on a float on the surface of a liquid the level of which is to be determined, to apply a magnetic field to the member at that point; and a transducer positioned at a second point along the member to sense the arrival at the second point of a mechanical impulse induced in the member by interaction between the current pulse and the magnetic field as the current pulse passes the magnet. A time measuring circuit responsive to the time interval between the feeding of the current pulse and the arrival of the mechanical impulse at the second point is used to determine the position of the first point.

U.S. Pat. No. 4,726,226 describes a measurement system for remotely measuring a parameter and relative distance having a parameter sensor providing signals to control the pulse repetition rate of a pulse generator, the pulses from the pulse generator in turn controlling a switch to alternately connect and disconnect an energy storage device to the input of a sonic waveguide device. The output signals at the outputs of the sonic waveguide device control a driving device which provides a representation of these output signals on a transmission line arrangement.

U.S. Pat. No. 3,898,555 relates to a linear distance measuring device to measure the time it takes a torsion pulse to traverse a sonic waveguide from a movable magnet to a pulse responsive element is determined and converted to a measurement of the distance from the movable magnet to the pulse responsive element. The position of the magnet moved by an external means such as a machine tool element can thus be determined precisely.

U.S. Pat. No. 4,361,037 describes a device for electric monitoring of the level of a liquid present in a tank, with a temperature-dependent resistance probe which is immersed in the liquid the level, a source of constant current connectable, controlled by a timer, to the resistance probe, a circuit, controlled by the timer, for detecting and storing an initial voltage drop on the resistance probe at an initial time and a measurement voltage at a defined time after the connection of the source of constant current, and a circuit for evaluating these voltages by subtraction of the measurement voltage from the initial voltage and if necessary under circumstances inversion of the difference in order to form a display voltage which corresponds to the level. There are provided a resistance probe structure for compensating for the influence of the change in level of the liquid on the display voltage due to thermal expansion as a function of its initial temperature and a computation circuit for compensating for different heat transfers from the resistance probe to the liquid as a function of the initial temperature.

U.S. Pat. No. 4,571,095 relates to a device for measuring a temperature comprising a first resistance, the resistance valve of which depends on the temperature to be measured, a second resistance, a multiple switch with a plurality of inputs and an output, wherein the resistances each are connected to a corresponding input, a supply source which can be coupled with both resistances through a switch and a processing unit for controlling the switch and the multiple switch and for determining the temperature in dependence on the voltages measured at the supply source being switched on and off respectively, in the subsequent positions of the multiple switch. The output of the multiple switch is connected to an input of voltage/frequency converter through a voltage source, an output of the voltage/frequency converter being connected to the processing unit.

SUMMARY OF THE INVENTION

The present invention relates to a liquid level and temperature sensing device.

The liquid level and temperature sensing device employs the Wiedemann Effect. Specifically an electrical conductor conducting an electrical current pulse will experience a twisting effect at the point that the magnetic field induced by the pulse interacts with other magnetic fields properly oriented along the conductor. This twisting effect will generate a torsional sonic pulse transmitted along the same conductor.

If the electrical conductor is placed vertically in the tank a float containing a magnet is allowed to move along the electrical conductor in response to the level of liquid in the tank, the distance between the top of the liquid to the top of the tank can be measured. An electrical pulse is transmitted along the electrical conductor, interacting with the magnetic field provided by the magnet in the float. At that point, a torsional sonic pulse will be transmitted along the electrical conductor to circuitry associated with the electrical conductor position thereon at or near the top of the tank.

A sonic transducer is disposed adjacent the electrical conductor at a reference location. The torsional sonic pulse transmitted along the electrical conductor interacts with the sonic transducer to generate an electrical signal.

The time duration or lapse between the start of the electrical pulse down the electrical conductor until the return of the sonic pulse transformed into an electrical pulse by the sonic transducer is a measure of the distance to the magnet in the float because of the known propagation velocity of such pulses. Hence, the distance is measured to the surface of the liquid. The propagation time of the electrical pulse down the electrical conductor is negligible compared to the propagation velocity of the torsional sonic pulse along the electrical conductor.

Sensing the temperature of the liquid in a tank is accomplished by the use of a temperature sensitive quartz crystal For most tank situations, there will be a desire to know the temperature at several locations in the tank.

The level and temperature data or information of the liquid in the tank may then be conveyed to a central monitor.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
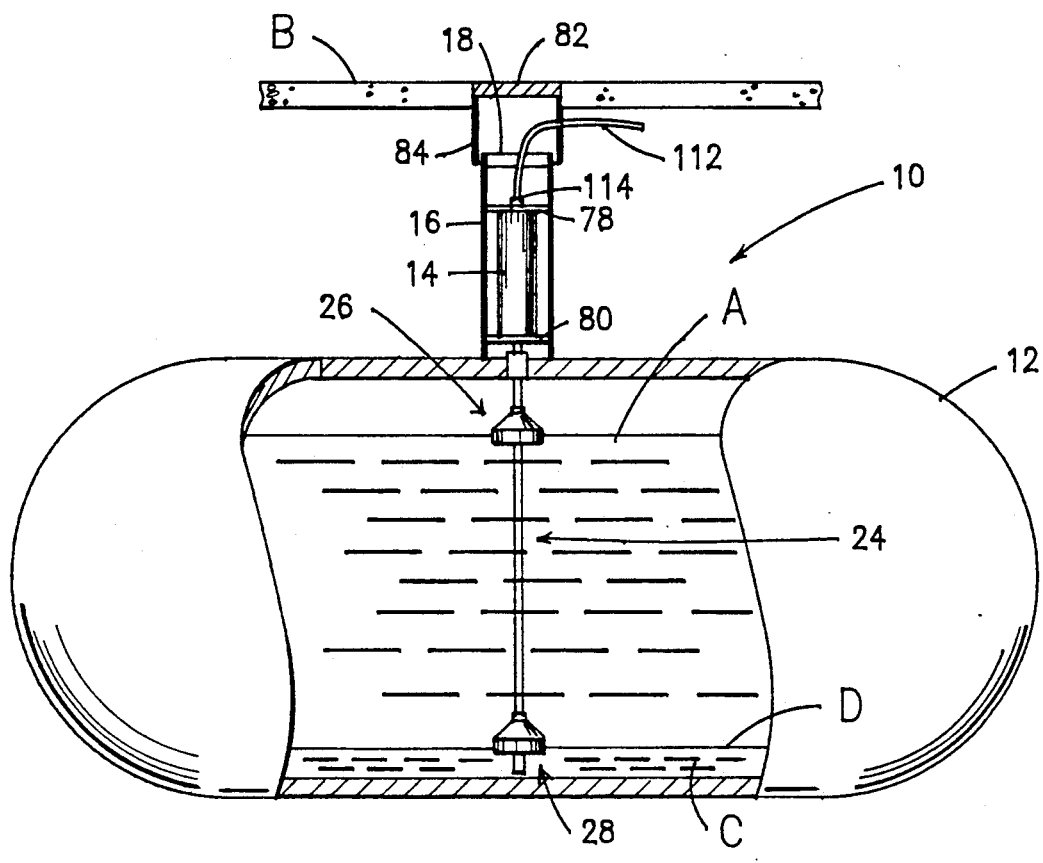
FIG. 1 is a front view of the liquid level and temperature sensing device with a tank or reservoir.
Figure 2A:
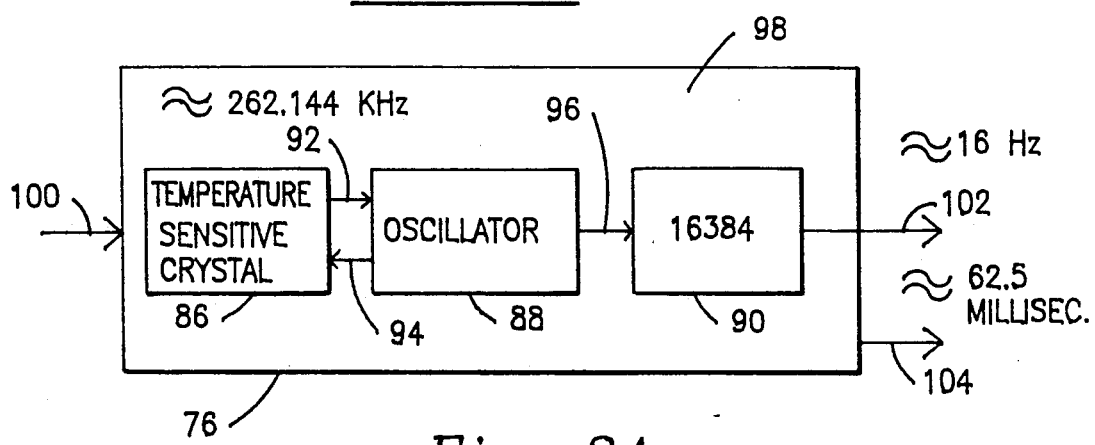
FIG. 2A is a detail view of the temperature sensor.
Figure 2:
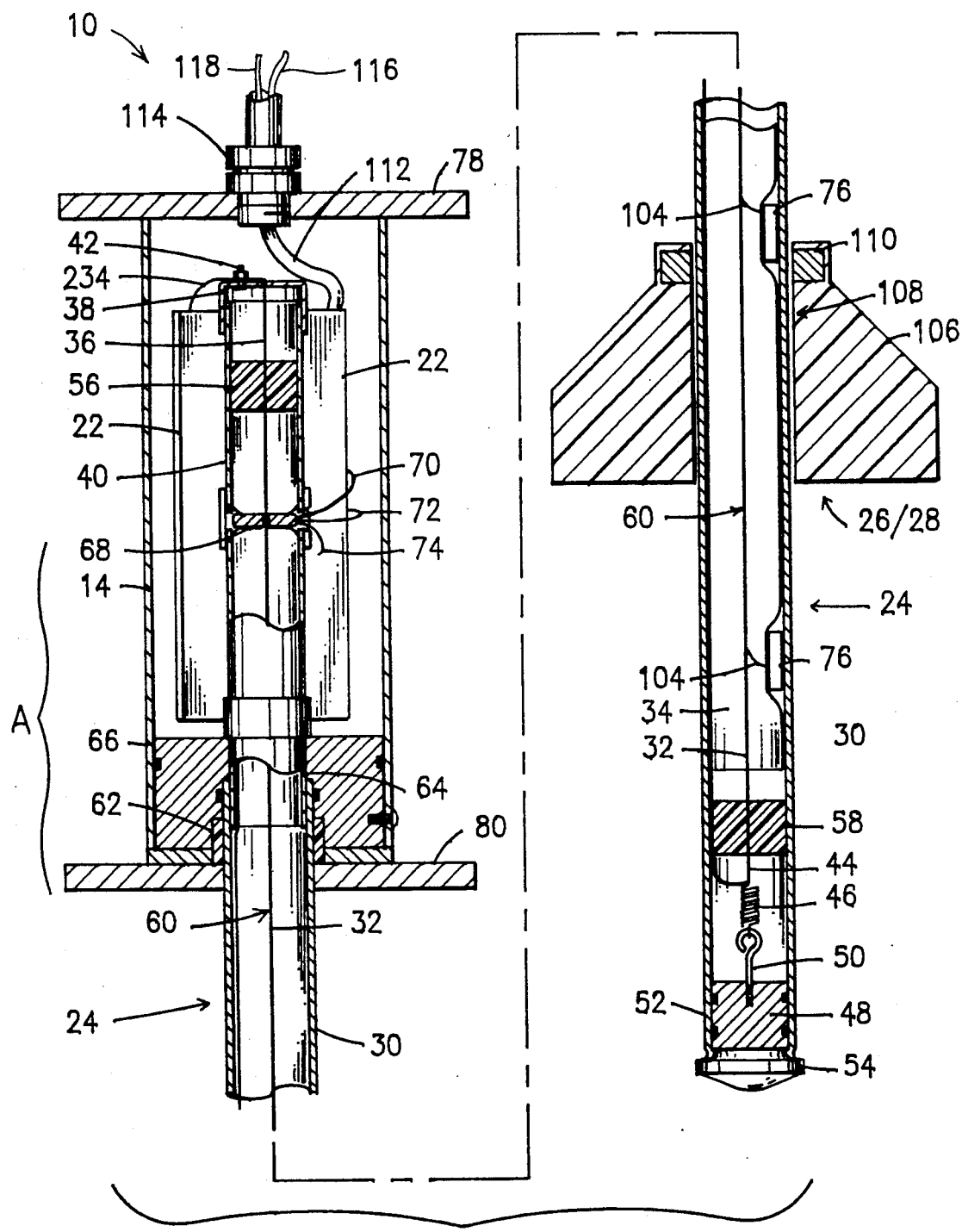
FIG. 2 is a detail cross-sectional view of the temperature sensing device.

As shown in FIGS. 1 and 2, the present invention relates to a liquid level and temperature sensing device generally indicated as 10 for monitoring and measuring the level and temperature of liquid A such as gasoline stored within a tank or reservoir 12.

As described more fully hereinafter, the liquid level and temperature sensing device 10 employs the Wiedemann Effect. Specifically an electrical conductor conducting an electrical current pulse will experience a twisting effect at the point that the magnetic field induced by the pulse interacts with other magnetic fields properly oriented along the conductor. This twisting effect will generate a torsional sonic pulse transmitted along the same conductor.

The time duration or lapse between the start of the electrical pulse down the electrical conductor until the return of the sonic pulse transformed into an electrical pulse by the sonic transducer is a measure of the distance to the magnet in the float because of the known propagation velocity of such pulses. Hence, the distance is measured to the surface of the liquid. The propagation time of the electrical pulse down the electrical conductor is negligible compared to the propagation velocity of the torsional sonic pulse along the electrical conductor. Sensing the temperature of the liquid in a tank is accomplished by the use of a temperature sensitive quartz crystal. For most tank situations, there will be a desire to know the temperature at several locations in the tank The level and temperature data or information of the liquid in the tank may then be conveyed to a central monitor.

Figure 4:
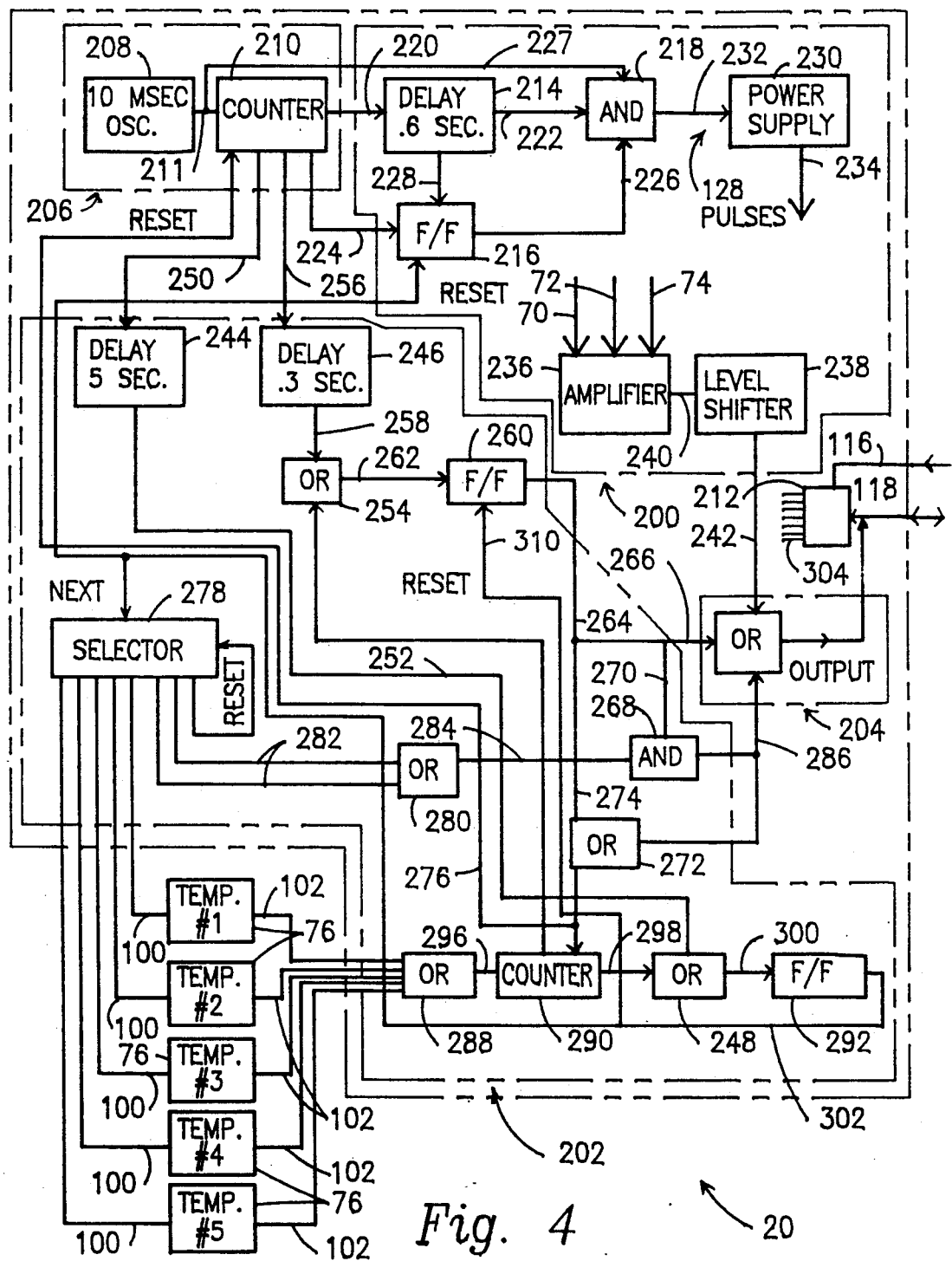
FIG. 4 is a block diagram of the control circuitry.

As best shown in FIGS. 1 and 2, the liquid level and temperature sensing device 10 comprises an upper control canister 14 disposed within an outer housing or riser pipe 16 affixed to the upper portion of the tank or reservoir 12 and cap or cover 18 to operatively house control circuitry generally indicated as 20 in FIG. 4 mounted on a plurality of printed circuit boards each indicated as 22 in FIG. 2, a lower sensing probe generally indicated as 24, and a first and second level sensing means generally indicated as 26 and 28 respectively.

As best shown in FIG. 2, the lower sensing probe 24 comprises an outer stainless steel tube 30, inner Ni-Span C conductor 32 and intermediate nonconductive tube 34. The upper end 36 of the Ni-Span C conductor 32 is affixed to the top 38 of a tubular collar 40 disposed within the canister 14 by a electrically conductive coupler 42; while the lower end 44 of the inner Ni-Span C conductor 32 is coupled to a bias or spring 46 attached to a lower support 48 by a coupling element 50. The lower support 48 is disposed in the lower end 52 of the outer stainless steel tube 30 adjacent a sealing end cap 54 The upper and lower ends 36 and 44 respectively of the Ni-Span C conductor 32 extend through an upper and lower damping means indicated as 56 and respectively to prevent or minimize vibrations the mid portion 60 of the inner Ni-Span C conductor 32 from being translated to the electrically conductive coupler 42 and bias or spring 46. The upper portion 62 of the lower sensing probe 24 and lower portion 64 of the tubular collar 40 are disposed within an upper support 66 within the upper control canister 14. A bifolar wound coil sonic transducer 68 disposed in spaced relationship relative to the inner Ni-Span C conductor 32 and mounted on the tubular collar 40 is electrically connected to the control circuitry 20 by a first, second and third conductor indicated as 70, 72 and 74 respectively. A plurality of temperature sensors each indicated as 76 coupled to the control circuitry 20 is disposed between the outer stainless steel tube 30 and the intermediate nonconductive tube 34.

As shown in FIGS. 1 and 2, the upper control canister 14 is operatively aligned and positioned within the outer housing or riser pipe 16 by an upper and lower spacer member indicated as 78 and 80 respectively. As shown in FIG. 1, when the tank or reservoir 12 is disposed beneath pavement or concrete B, access to the liquid level and temperature sensing device 10 is achieved by removal of a cover 82 inwardly disposed to seal a hollow access housing 84.

As shown in FIG. 2A, each temperature sensor 76 comprises a temperature sensitive crystal 86, oscillator 88 and counter 90, electrically coupled together by conductors 92, 94 and 96 and electrically mounted on printed circuit board 98. External power is fed from the control circuitry 20 through conductors 100 to the respective oscillators 88 on the printed circuit boards 98 as described more fully hereinafter. The temperature sensitive crystal 86 has fundamental or predetermined frequency of 262.144 kilohertz at 20 degrees Centigrade. This output frequency of the temperature sensitive crystal 86 will vary from the fundamental frequency in direct proportion to change or difference in temperature above or below the base of 20 degrees Centigrade.

The output frequency of the oscillator 88, corresponding with the actual output frequency of the temperature sensitive crystal 86, is divided by the counter 90 and transmitted to the control circuitry 20 through conductor 102 representing the temperature sensed at the particular depth or level of the corresponding temperature sensor 76. The ground conductors 104 may be connected in series between adjacent temperature sensors 76 or coupled directly to the control circuitry 20.

As best shown in FIGS. 1 and 2, the first and second level sensing means 26 and 28 each comprise a buoyant member 106 including a centrally disposed channel 108 having a toroidal magnet 110 disposed in the upper portion thereof. The first level sensing means 26 buoyant member 106 has a first specific gravity to float on the upper liquid A such as gasoline, while, the second level sensing means 28 buoyant member 106 has a second specify gravity to float at the interface D between the upper liquid A and lower liquid C such as water as shown in FIG. 1. That is, the specific gravity of the second level sensing means 28 is greater than the specific gravity of the first level sensing means 26.

As described more fully hereinafter, the control circuitry 20 is coupled to a remote power source (not shown) and monitor or receiver (not shown) by a cable 112 extending through a connector 114. The cable 112 includes both a general conductor 116 and a combined D.C. power supply and output signal conductor 118.

As best seen in FIG. 4, the control circuitry 20 comprises level sensing logic circuitry 200 and temperature sensing logic circuitry 202; information signal output or OR gate 204 and timing for the control circuitry 20 provided by a combination timing means 206 including an oscillator 208 coupled to a counter 210 through conductor 211. Power is supplied through the conductor 118 to the individual components of the control circuitry 20 through a power supply 212.

The liquid level logic circuitry 200 comprises a delay switch 214 and a combination of flip flops 216 configured to operatively coupled between the counter 210 and an AND gate 218 by conductors 220/222 and conductors 224/226 respectively. In addition the output of the oscillator 208 is coupled to the AND gate 218 through conductor 227. The delay switch 214 is coupled to the flip flop 216 by a conductor 228. The output of the AND gate 218 is fed to a liquid level power supply 230 through a conductor 232 for transmission to the Ni-Span conductor 32 through a conductor 234. The liquid level logic circuitry 200 further includes an amplifier 236 coupled to the sonic transducer 68 through conductors 70, 72 and 74 coupled to a level shifter 238 by conductor 240 coupled to the signal output 204 by a conductor 242.

The temperature sensing logic circuitry 202 comprises a first and second delay switch indicated as 244 and 246 respectively. The first delay switch 244 is coupled between the counter 210 and a first OR gate 248 by conductors 250 and 252; while, the second delay switch 246 is coupled between the counter 210 and a second OR gate 254 through conductors 256 and 258. The output of the second OR gate 254 is fed to a flip flop 260 by a conductor 262. The output of the flip flop 260 is fed to the signal output 204 through conductors 264 and 266, an AND gate 268 through conductors 264 and 270 and an OR gate 272 through conductors 264 and 274. The output of the OR gate 272 is coupled to the counter 210 through a conductor 226 to reset the counter 210. The temperature sensing logic circuitry 202 further includes a temperature sensor selector 278 coupled to the individual temperature sensors 76 through the conductors 100 to sequentially poll the individual temperature sensors 76 in a predetermined order and through the OR gate 280 and the AND gate 268 to the signal output 204 through conductors 282, 284 and 286. An OR gate 288, temperature sensing counter 290, OR gate 248 and flip flop 292 are coupled between the temperature sensors 76 and the selector 276 through conductors 102, 296, 298, 300 and 302.

The power from the power supply source (not shown) through conductor 118 is fed to the respective components of the control circuitry 20 from the circuitry power supply 212 by a plurality of conductors each indicated as 304.

Figure 3:
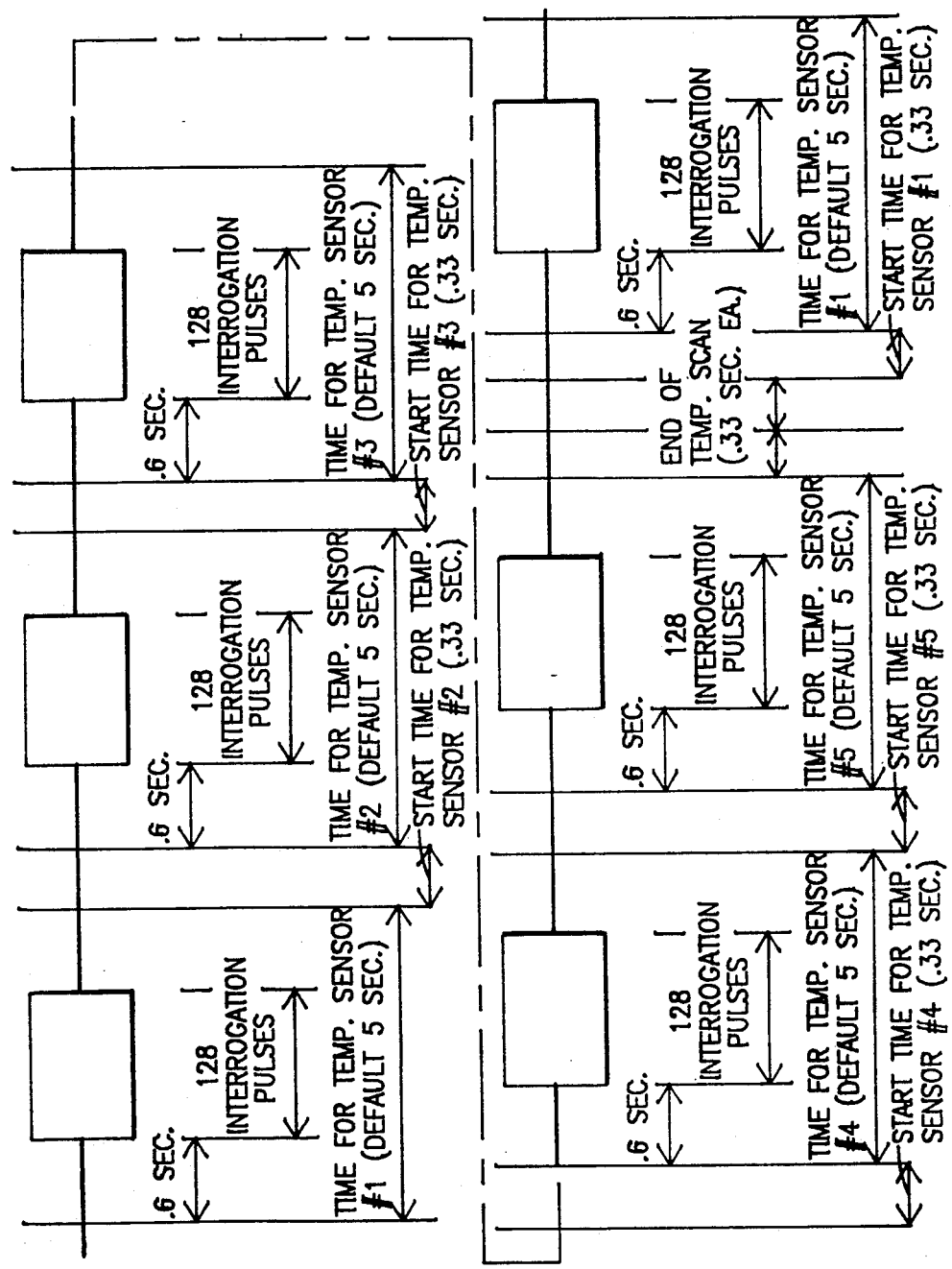
FIG. 3 is a system timing diagram.
Figure 3A:
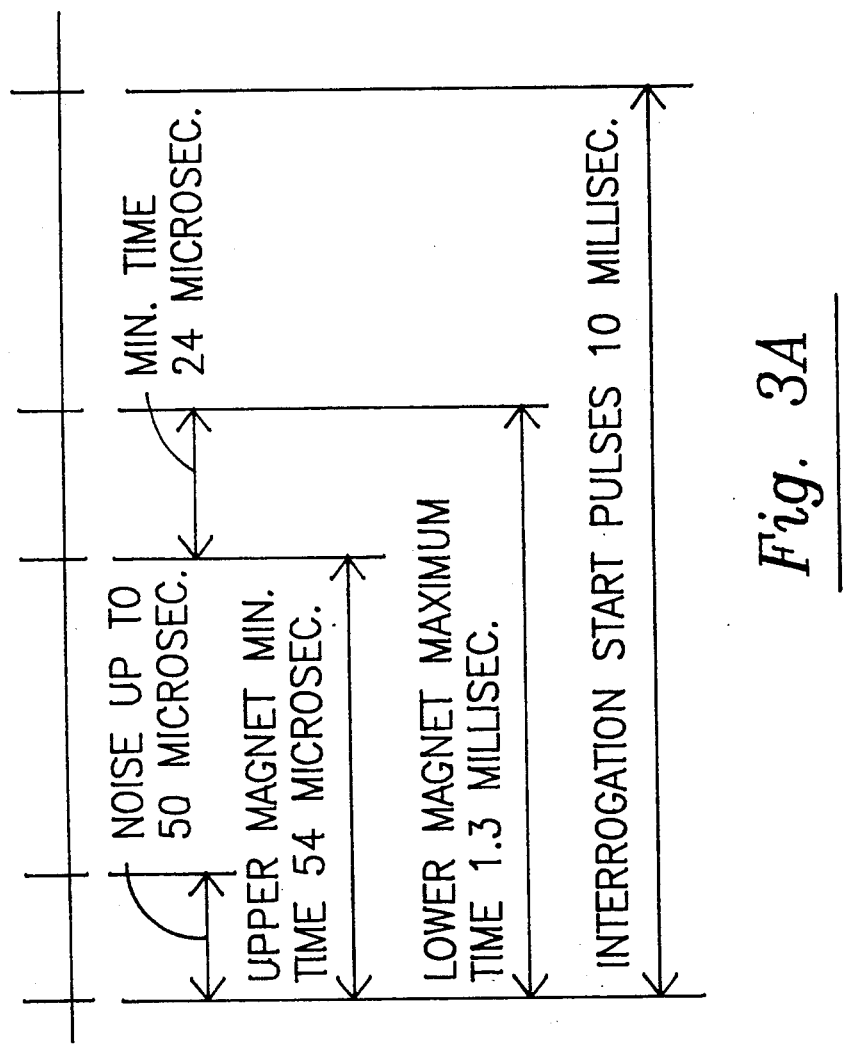
FIG. 3A shows the liquid level information timing diagram.

The sequence and timing of the operation is best understood with reference to FIGS. 3 and 3A. Initially the temperature information generated by start and stop pulses for approximately 4 second temperature pulse period. The time period is inversely related to the temperature sensed at the particular individual temperature sensor 76. During the temperature pulse period there are 128 level interrogation pulses generated. These pulses are timed by the oscillator 208 operating at 10 milliseconds per cycle. There will be sonic pulses generated by the first and second level sensing means 26 and 28 in response to end of the interrogation pulses. The sonic transducer 68 generates level information pulses that are fed through amplifier 236 to output or OR gate 204 for transmission to the receiver or display monitor (not shown) 118 for display. The maximum time frame for one of the level cycles is 1.455 milliseconds. The total time frame for all 128 level cycles is approximately 1.28 seconds. The separation between the stop pulse of one temperature sensor 76 and the start pulse of the next is determined by the start-up time 0.075 to 0.25 seconds of the next temperature sensor 76. There is a default value, 0.33 seconds should a failure of this temperature sensor 76 occur. Following the signal from the fifth temperature sensor 76, there are two unique pulses to indicate the end of the temperature cycle. The time values for the temperature pulse period and the number of level cycles are determined by using a receiver or monitor (not shown) containing a 10 MHz oscillator.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A liquid level sensing device for monitoring and measuring the level of liquid stored within a tank or reservoir comprising an upper control canister to house control circuitry to generate and transmit digital level interrogation pulses, a lower sensing probe including an outer tube to operatively house a solid inner conductor coupled to said control circuitry to receive said digital level interrogation pulses and a first level sensing means movable disposed relative to said outer tube to interact with the electromagnetic field generated in said solid inner conductor by said digital level interrogation pulses to generate a corresponding series of sonic pulses and a transducer disposed in operative relationship relative to said solid inner conductor including means to sense said series of sonic pulses and generate a corresponding series of electrical signals, said control circuitry coupled to said transducer to receive said corresponding series of electrical signals and including means to measure the time lapse between said digital level interrogation pulses and said corresponding electrical signals to indicate the relative position of said first level sensing means relative to the longitudinal axis of said inner conductor corresponding to the level of an upper liquid within the tank or reservoir and means to generate a liquid level output signal corresponding to the level of the upper liquid for transmission to a display monitor and a second level sensing means disposed beneath said first level sensing means, said second level sensing means movable disposed relative to said outer tube to interact with the electromagnetic field generated in said solid inner conductor by said digital level interrogation pulses to generate a corresponding second series of sonic pulses and said transducer is disposed in operative relationship relative to said solid inner conductor including means to sense said second series of sonic pulses and generate a corresponding second series of electrical signals, said control circuitry coupled to said transducer to receive said corresponding second series of electrical signals and including means to measure the time lapse between said digital level interrogation pulses and said corresponding second series of electrical signals to indicate the relative position of said second level sensing means relative to the longitudinal axis of said inner conductor corresponding to the level of a lower liquid within the tank or reservoir and means to generate a second liquid level output signal corresponding to the level of a lower liquid for transmission to the display monitor.

2. The liquid level sensing device of claim 1 wherein the specific gravity of said first level sensing means is less than the specific gravity of said second level sensing means such that said first level sensing means floats on the upper liquid and said second level sensing means floats at the interface between the upper liquid and the lower, liquid.

3. The liquid level sensing device of claim 11, wherein the time lapse between said first series of sonic pulses and said corresponding second pulses represent a desk of the upper liquid stored within the tank or reservoir.

4. The liquid level sensing device of claim 1 wherein said first and second level sensing means each comprises a buoyant member including a centrally disposed channel having a toroidal magnet disposed therein.

5. The liquid level sensing device of claim 1 further including at least one temperature sensor including logic circuitry to generate a temperature signal corresponding to the temperature of the liquid adjacent said temperature sensor disposed within said outer tube coupled to the control circuitry to transmit the temperature signal thereto, said control circuitry further including output signal circuitry to transmit a liquid level output signal corresponding to the level of liquid within the tank or reservoir and a temperature output signal corresponding to the sensed temperature for transmission to a display monitor to display the sensed liquid level and temperature.

6. The liquid level sensing device of claim 1 wherein said transducer comprises a bifolar wound coil sonic transducer disposed in spaced relationship relative to said solid inner conductor.

7. The liquid level sensing device of claim 6 wherein said inner conductor comprises an inner Ni-Span C conductor.

8. The liquid level sensing device of claim 7 wherein said lower sensing probe further includes an intermediate nonconductive tube disposed between said outer tube and said inner Ni-Span C conductor.

9. The liquid level sensing device of claim 1 further including at least one temperature sensor including logic circuitry to generate a temperature signal corresponding to the temperature of the liquid adjacent said temperature sensor disposed within said outer tube coupled to the control circuitry to transmit the temperature signal thereto, said control circuitry further including output signal circuitry to generate a temperature output signal corresponding to the sensed temperature for transmission to a display monitor to display the sensed temperature.

10. The liquid level sensing device of claim 9 including a plurality of said temperature sensors disposed in spaced relationship relative to each other to provide corresponding temperature information at a corresponding number of depths.

11. A liquid level sensing device for monitoring and measuring the level of liquid stored within a tank or reservoir comprising an upper control canister to house control circuitry to generate and transmit digital level interrogation pulses, a lower sensing probe including an outer tube to operatively house a solid inner conductor comprising a Ni-Span C conductor coupled to said control circuitry to receive said digital level interrogation pulses and a first level sensing means movable disposed relative to said outer tube to interact with the electromagnetic field generated in said solid inner conductor by said digital level interrogation pulses to generate a corresponding series of sonic pulses and a transducer comprising a bifolar wound coil sonic transducer disposed in spaced relationship relative to said inner conductor disposed in operative relationship relative to said solid inner conductor including means to sense said series of sonic pulses and generate a corresponding series of electrical signals, said control circuitry coupled to said transducer to receive said corresponding series of electrical signals and including means to measure the time lapse between said digital level interrogation pulses and said corresponding electrical signals to indicate the relative position of said first level sensing means relative to the longitudinal axis of said inner conductor corresponding to the level of liquid within the tank or reservoir and means to generate a liquid level output signal corresponding to the level of the liquid for transmission to a display monitor.

12. The liquid level and temperature sensing device of claim 11 further including a second level sensing means disposed beneath said first level sensing means, said second level sensing means movable disposed relative to said outer tube to interact with the electromagnetic field generated in said solid inner conductor by said digital level interrogation pulses to generate a corresponding second series of sonic pulses and said transducer is disposed in operative relationship relative to said solid inner conductor including means to sense said second series of sonic pulses and generate a corresponding second series of electrical signals, said control circuitry coupled to said transducer to receive said corresponding second series of electrical signals and including means to measure the time lapse between said digital level interrogation pulses and said corresponding second series electrical signals to indicate the relative position of said second level sensing means relative to the longitudinal axis of said inner conductor corresponding to the level of a lower liquid within the tank or reservoir and means to generate a second liquid level output signal corresponding to the level of the lower liquid for transmission to the display monitor.

13. The liquid level sensing device of claim 12 wherein said first and second level sensing means each comprises a buoyant member including a centrally disposed channel having a toroidal magnet disposed therein.

14. The liquid level sensing device of claim 13 wherein the specific gravity of said first level sensing means is less than the specific gravity of said second level sensing means such that said first level sensing means floats on the upper liquid and said second level sensing means floats at the interface between the upper liquid and the lower liquid.

15. The liquid level sensing device of claim 11 wherein said lower sensing probe further includes an intermediate nonconductive tube disposed between said outer tube and said inner Ni-Span C conductor.

16. The liquid level sensing device of claim 11 further including at least one temperature sensor including logic circuitry to generate a temperature signal corresponding to the temperature of the liquid adjacent said temperature sensor disposed within said outer tube coupled to the control circuitry to transmit the temperature signal thereto, said control circuitry further including output signal circuitry to generate a temperature output signal corresponding to the sensed temperature for transmission to a display monitor to display the sensed temperature.

17. The liquid level sensing device of claim 16 including a plurality of said temperature sensor disposed in spaced relationship relative to each other to provide corresponding temperature information at a corresponding number of depths.

18. A liquid level sensing device for monitoring and measuring the level of liquid stored within a tank or reservoir comprising an upper control canister to house control circuitry to generate and transmit digital level interrogation pulses, a lower sensing probe including an outer tube to operatively house a second inner conductor coupled to said control circuitry to receive said digital level interrogation pulses and a first level sensing means movable disposed relative to said outer tube to interact with the electromagnetic field generated in said solid inner conductor by said digital level interrogation pulses to generate a corresponding series of sonic pulses and a transducer disposed in operative relationship relative to said solid inner conductor including means to sense said series of sonic pulses and generate a corresponding series of electrical signals, said control circuitry coupled to said transducer to receive said corresponding series of electrical signals and including means to measure the time lapse between said digital level interrogation pulses and said corresponding electrical signals to indicate the relative position of said first level sensing means relative to the longitudinal axis of said inner conductor corresponding to the level of liquid within the tank or reservoir and means to generate a liquid level output signal corresponding to the level of the liquid for transmission to a display monitor and a temperature sensor including logic circuitry to generate a temperature signal corresponding to the temperature of the liquid adjacent said temperature sensor disposed within said outer tube coupled to the control circuitry to transmit the temperature signal thereto, said control circuitry further including output signal circuitry to generate a temperature output signal corresponding to the sensed temperature for transmission to the display monitor.

19. The liquid level sensing device of claim 18 including a plurality of said temperature sensors disposed in spaced relationship relative to each other to provide corresponding temperature information at a corresponding number of depths.

20. The liquid level and temperature sensing device of claim 18 further including a second level sensing means disposed beneath said first level sensing means, said second level sensing means movable disposed relative to said outer tube to interact with the electromagnetic field generated in said solid inner conductor by said digital level interrogation pulses to generate a corresponding second series of sonic pulses and said transducer is disposed in operative relationship relative to said solid inner conductor including means to sense said second series of sonic pulses and generate a corresponding second series of electrical signals, said control circuitry coupled to said transducer to receive said corresponding second series of electrical signals and including means to measure the time lapse between said digital level interrogation pulses and said corresponding second series of electrical signals to indicate the relative position of said second level sensing means relative to the longitudinal axis of said inner conductor corresponding to the level of a lower liquid within the tank or reservoir and means to generate a second liquid level output signal corresponding to the level of the lower liquid for transmission to a display monitor.

21. The liquid level sensing device of claim 20 wherein said first and second level sensing means each comprises a buoyant member including a centrally disposed channel having a toroidal magnet disposed therein.

22. The liquid level sensing device of claim 20 wherein the specific gravity of said first level sensing means is less than the specific gravity of said second level sensing means such that said first level sensing means floats on the upper liquid and said second level sensing means floats at the interface between the upper liquid and the lower liquid.

23. The liquid level sensing device of claim 18 wherein said transducer comprises a bifolar wound coil sonic transducer disposed in spaced relationship relative to said solid inner conductor.

24. The liquid level sensing device of claim 23 wherein said inner conductor comprises an inner Ni-Span C conductor.

25. The liquid level sensing device of claim 24 wherein said lower sensing probe further includes an intermediate nonconductive tube disposed between said outer tube and said inner Ni-Span C conductor.

* * * * *